US012639055B2

(12) United States Patent
Grover et al.

(10) Patent No.: US 12,639,055 B2
(45) Date of Patent: May 26, 2026

(54) DYNAMIC COMPILER PARALLELISM TECHNIQUES

(71) Applicant: Nvidia Corporation, Santa Clara, CA (US)

(72) Inventors: Vinod Grover, Mercer Island, WA (US); Thibaut Lutz, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/215,508

(22) Filed: Dec. 10, 2018

(65) Prior Publication Data

US 2019/0121625 A1       Apr. 25, 2019

Related U.S. Application Data

(63) Continuation of application No. 14/602,258, filed on Jan. 21, 2015, now Pat. No. 10,152,312.

(51) Int. Cl.
*G06F 8/41*          (2018.01)
*G06F 9/455*          (2018.01)

(52) U.S. Cl.
CPC .............. *G06F 8/4443* (2013.01); *G06F 8/47* (2013.01); *G06F 9/4552* (2013.01)

(58) Field of Classification Search
CPC ......... G06F 8/4443; G06F 9/4552; G06F 8/47
USPC ........................................................ 717/148
See application file for complete search history.

(56) References Cited

U.S. PATENT DOCUMENTS

| | | | |
|---|---|---|---|
| 5,765,036 | A | 6/1998 | Lim |
| 5,970,241 | A | 10/1999 | Deao et al. |
| 6,324,683 | B1 | 11/2001 | Fuh et al. |
| 6,343,371 | B1 | 1/2002 | Flanagan et al. |
| 6,571,320 | B1 | 5/2003 | Hachmann |
| 7,065,630 | B1 | 6/2006 | Ledebohm et al. |
| 7,366,956 | B2 | 4/2008 | Karp et al. |
| 7,516,446 | B2 | 4/2009 | Choi et al. |
| 7,549,150 | B2 | 6/2009 | Yu |
| 7,584,332 | B2 | 9/2009 | Kogge et al. |
| 7,673,181 | B1 | 3/2010 | Lindo et al. |
| 7,757,237 | B2 | 7/2010 | Karp et al. |
| 7,992,146 | B2 | 8/2011 | Krauss |
| 8,028,133 | B2 | 9/2011 | Dice et al. |
| 8,095,750 | B2 | 1/2012 | Heller, Jr. |
| 8,117,403 | B2 | 2/2012 | Heller, Jr. et al. |
| 8,296,743 | B2 * | 10/2012 | Linderman ............. G06F 9/505 |
| | | | 717/140 |
| 8,321,637 | B2 | 11/2012 | Baum et al. |

(Continued)

FOREIGN PATENT DOCUMENTS

| | | |
|---|---|---|
| DE | 102006032832 A1 | 1/2008 |
| WO | 2006115769 A2 | 11/2006 |

OTHER PUBLICATIONS

U.S. Non-Final Office Action issued in U.S. Appl. No. 14/602,258 dated Apr. 22, 2016 (related issued U.S. Pat. No. 10,152,312).

(Continued)

*Primary Examiner* — Qing Chen
(74) *Attorney, Agent, or Firm* — Davis Wright Tremaine LLP

(57) ABSTRACT

Compiler techniques lot inline parallelism and re-targetable parallel runtime execution of logic iterators enables selection thereof from the source code or dynamically during the object code execution.

20 Claims, 3 Drawing Sheets

(56) References Cited

U.S. PATENT DOCUMENTS

| | | | |
|---|---|---|---|
| 8,375,368 B2 | 2/2013 | Tuck | |
| 8,448,156 B2 | 5/2013 | Demetriou et al. | |
| 8,487,946 B2 | 7/2013 | Stauffer et al. | |
| 8,719,839 B2* | 5/2014 | Yan | G06F 9/544 |
| | | | 719/331 |
| 8,860,741 B1 | 10/2014 | Juffa et al. | |
| 8,972,694 B1 | 3/2015 | Dolan et al. | |
| 9,052,948 B2* | 6/2015 | Munshi | G06F 9/541 |
| 9,547,535 B1 | 1/2017 | Wilt | |
| 9,563,571 B2 | 2/2017 | Kumar | |
| 9,619,364 B2 | 4/2017 | Venkataraman | |
| 9,886,736 B2 | 2/2018 | Perelygin et al. | |
| 10,152,312 B2 | 12/2018 | Grover et al. | |
| 2003/0131283 A1 | 7/2003 | Ur et al. | |
| 2003/0145124 A1 | 7/2003 | Guyan et al. | |
| 2003/0210248 A1 | 11/2003 | Wyatt | |
| 2004/0160449 A1 | 8/2004 | Gossalia | |
| 2005/0015752 A1 | 1/2005 | Alpern et al. | |
| 2005/0125572 A1 | 6/2005 | Ganapathy et al. | |
| 2005/0273570 A1 | 12/2005 | DeSouter et al. | |
| 2005/0283781 A1 | 12/2005 | Karp et al. | |
| 2006/0218553 A1 | 9/2006 | Dore et al. | |
| 2006/0224858 A1 | 10/2006 | Wang | |
| 2006/0225056 A1 | 10/2006 | Mukkavilli | |
| 2006/0259691 A1 | 11/2006 | Jeremiassen | |
| 2006/0267990 A1 | 11/2006 | Rogers | |
| 2007/0011671 A1 | 1/2007 | Kahlon et al. | |
| 2007/0245312 A1 | 10/2007 | Qadeer et al. | |
| 2007/0294512 A1* | 12/2007 | Crutchfield | G06F 8/443 |
| | | | 712/E9.033 |
| 2007/0294680 A1* | 12/2007 | Papakipos | G06F 8/456 |
| | | | 717/149 |
| 2007/0294696 A1* | 12/2007 | Papakipos | G06F 11/3612 |
| | | | 718/102 |
| 2008/0028181 A1 | 1/2008 | Tong et al. | |
| 2008/0109795 A1* | 5/2008 | Buck | G06F 8/443 |
| | | | 717/137 |
| 2008/0301657 A1 | 12/2008 | Bowler et al. | |
| 2008/0312095 A1 | 12/2008 | Kirovski et al. | |
| 2009/0007087 A1 | 1/2009 | Ito et al. | |
| 2009/0019451 A1 | 1/2009 | Matsuzaki et al. | |
| 2010/0118041 A1 | 5/2010 | Chen et al. | |
| 2010/0153934 A1* | 6/2010 | Lachner | G06F 8/45 |
| | | | 717/146 |
| 2010/0156888 A1* | 6/2010 | Luk | G06T 1/20 |
| | | | 345/418 |
| 2010/0250809 A1 | 9/2010 | Ramesh et al. | |
| 2010/0328325 A1* | 12/2010 | Sevigny | G06T 1/20 |
| | | | 345/522 |
| 2011/0078427 A1 | 3/2011 | Shebanow | |
| 2011/0145650 A1 | 6/2011 | Krauss | |
| 2011/0161619 A1 | 6/2011 | Kaminski et al. | |
| 2011/0167412 A1 | 7/2011 | Kahlon et al. | |
| 2011/0185359 A1 | 7/2011 | Chakrabarti | |
| 2011/0314458 A1 | 12/2011 | Zhu et al. | |
| 2012/0066668 A1* | 3/2012 | Buck | G06F 8/443 |
| | | | 717/149 |
| 2012/0198178 A1 | 8/2012 | Cox et al. | |
| 2012/0254497 A1 | 10/2012 | Ni et al. | |
| 2013/0036408 A1 | 2/2013 | Auerbach et al. | |
| 2013/0055272 A1* | 2/2013 | Munshi | G06F 9/5044 |
| | | | 718/102 |
| 2013/0061240 A1* | 3/2013 | Yan | G06F 9/544 |
| | | | 719/312 |
| 2013/0086564 A1* | 4/2013 | Felch | G06F 8/4441 |
| | | | 717/145 |
| 2013/0138840 A1 | 5/2013 | Kegel et al. | |
| 2013/0198494 A1* | 8/2013 | Grover | G06F 8/53 |
| | | | 712/226 |
| 2013/0262784 A1 | 10/2013 | Asaro et al. | |
| 2013/0304996 A1 | 11/2013 | Venkataraman et al. | |
| 2013/0305252 A1 | 11/2013 | Venkataraman et al. | |
| 2014/0049551 A1 | 2/2014 | Rao et al. | |
| 2014/0137130 A1 | 5/2014 | Jacob et al. | |
| 2014/0184606 A1* | 7/2014 | de Richebourg | G06T 13/80 |
| | | | 345/440 |
| 2014/0237609 A1 | 8/2014 | Sharp et al. | |
| 2014/0281727 A1 | 9/2014 | Venkataraman | |
| 2015/0206272 A1 | 7/2015 | Perelygin et al. | |
| 2015/0206277 A1 | 7/2015 | Rao et al. | |
| 2015/0277877 A1 | 10/2015 | Feng et al. | |
| 2016/0011857 A1 | 1/2016 | Grover et al. | |
| 2016/0188251 A1 | 6/2016 | Dunning et al. | |

OTHER PUBLICATIONS

U.S. Final Office Action issued in U.S. Appl. No. 14/602,258 dated Dec. 13, 2016 (related issued U.S. Pat. No. 10,152,312).

U.S. Non-Final Office Action issued in U.S. Appl. No. 14/602,258 dated Jun. 30, 2017 (related issued U.S. Pat. No. 10,152,312).

U.S. Final Office Action issued in U.S. Appl. No. 14/602,258 dated Mar. 23, 2018 (related issued U.S. Pat. No. 10,152,312).

U.S. Notice of Allowance issued in U.S. Appl. No. 14/602,258 dated Oct. 15, 2018 (related issued U.S. Pat. No. 9,483,235).

"Memory Management" (by WordPress in 2008).

Artho, Cyrille, et al., "Using Block-Local Atomicity to Detect Stale-Value Concurrency Errors," ATVA 2004, Oct. 31-Nov. 3, 2004, pp. 150-164.

Bergan, Tom, et al., "CoreDet: A Compiler and Runtime System for Deterministic Multithreaded Execution," ASPLOS 2010, Mar. 13-17, 2010, pp. 53-64.

Butelle, Franck, et al. "A Model for Coherent Distributed Memory for Race Condition Detection," 2011 IEEE IPDPS, May 16-20, 2011, pp. 584-590.

Flanagan, Cormac, et al., "FastTrack: Efficient and Precise Dynamic Race Detection," Communications of the ACM, 53(11): 2009, pp. 93-101.

Higuera-Toledano, M. T., "Towards an Analysis of Race Carrier Conditions in Real-time Java," 2006 IEEE, Apr. 25-29, 2006, pp. 1-7.

Office Action for German Application No. 112015000430.0, mailed Aug. 9, 2022, 17 pages.

Prvulovic, Milos, "CORD: Cost-effective (and nearly overhead-free) Order-Recording and Data Race Detection," 12th IPCA, Feb. 2006, pp. 1-12.

Sandgren, "Transfer Time Reduction of Data Transfers Between CPU and GPU," Thesis of UPPSALA Universitet, retrieved from http://uu.diva-portal.org/smash/get/diva2:641061/, 2012, 54 pages.

Sathiyamurthy, K., et al., "Automated Reasoning Tool for the Detection of Race Conditions in Web Services," 2007 IEEE ICCIMA, Dec. 13-15, 2007, pp. 61-65.

Ueng, et al., "CUDA-Lite: Reducing GPU Programming Complexity," Journal vol. 5335, Springer-Verlag Berlin Heidelberg, 2008, pp. 10-24.

* cited by examiner

DYNAMIC COMPILER PARALLELISM TECHNIQUES

CROSS-REFERENCE TO RELATED APPLICATIONS

This application claims the benefit of U.S. application Ser. No. 14/602,258 filed Jan. 21, 2015 entitled "Dynamic Compiler Parallelism Techniques," which application claims benefit to U.S. Provisional Patent Application No. 61/929, 913 filed Jan. 21, 2014, which are incorporated herein in their entirety.

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, smart phones, servers, and the like have facilitated increased productivity and reduced costs in communicating and analyzing data in most areas of entertainment, education, business, and science, One common aspect of computing devices is execution of software by one or more processing units, each processing unit including one or more processing cores and or are capable of executing one or more threads, to provide for parallel processing.

Conventional computing devices may include one or more central processing units (CPUs) and one or more graphics processing units (GPUs). However, utilization of the GPU is limited to particular specialized processing. Accordingly, there is a continuing need to increase the utilization of the GPUs to increase the processing performance of computing devices containing GPUs.

SUMMARY OF THE INVENTION

The present technology may best be understood by referring to the following description and accompanying drawings that are used to illustrate embodiments of the present technology directed toward parallel processing.

The inline parallelism and re-targetable parallel processing techniques described herein relate generally to the field of compilers and more specifically to the field of compiling and running of applications or portions thereof on a graphics processor. The techniques provide solutions to the challenges inherent in supporting inline parallelism used in the standard C++ language and support the parallel algorithms approach. In one embodiment, an exemplary compiler and runtime are operable to execute an application on a native central processing unit (CPU) entirely or can dynamically offload and just-in-time (JIT) the parallel loop to the graphics processing unit (GPU) or any other processing unit. Exemplary embodiments will be operable to recompile and run standard. CPU C++ applications in a GPU and increase the value of the GPUs.

In one embodiment, a computing device for implementing embodiments of the present technology includes a compiler and a runtime library. The compiler receives source code that includes a logic iterator, such as a C++ parallel for each iterator. The compiler coverts the source code to a first portion of object code for execution on the CPU of the computing device. An intermediate representation of the logic iterator is generated by the compiler and includes a specifier of a particular target and execution policy. The runtime library includes a plurality of runtime environment algorithms including implementations of target and execution policies. The target and execution policies include ahead-of-time (AOT) compilation for execution on the CPU, just-in-time (JIT) compilation for sequential execution on the CPU (e.g., std:seq), JIT compilation for parallel execution on the CPU (e.g., std::par), JIT compilation for parallel execution on a GPU of the computing device (e.g., std::gpu), and runtime selectable compilation and execution (e.g., std::env).

The compiler is configured to embed the intermediate representation of the logic iterator into the compiled first portion of machine code when the specifier of the particular target and execution policy indicates JIT compilation for sequential execution on the CPU, JIT compilation for parallel execution on the CPU, JIT compilation for execution on a GPU, or runtime selectable compilation and execution.

In another embodiment a compiler method of inline parallelism and re-targetable parallel runtime execution includes receiving source code including a logic iterator with a specifier of a particular target and execution policy by a compiler. The compiler accesses a runtime library including a plurality of runtime environment algorithms including implementations of a target and execution policies selected from a group consisting of AOT compilation for execution on a CPU, JIT compilation for sequential execution on the CPU, JIT compilation for parallel execution on the CPU, JIT compilation for parallel execution on a GPU, and runtime selectable compilation and execution. Based upon the accesses to the runtime library, the source code is compiled into an intermediate representation including the specifier of the particular target and execution policy. The intermediate representation in turn is compiled into a first portion of machine code for a particular CPU by the complier utilizing the runtime library.

When the specifier of the particular target and execution policy indicates JIT compilation for execution on the GPU, the intermediate representation of the logic iterator is embedded in the first portion of machine code. Thereafter, the first portion of machine code is executed in a runtime environment on the particular CPU. When the specifier of the particular target and execution policy (e.g., std::GPU) indicates JIT compilation for execution on the GPU, the intermediate representation of the logic iterator is compiled into a second portion of machine code and executed on a particular GPU instead of on the CPU. Similarly, when the specifier Of the particular target and execution policy (e.g., std.::env) indicates runtime selectable JIT compilation and execution on the GPU, the intermediate representation of the logic iterator is dynamically compiled into a second portion of machine code and executed on the particular GPU instead of on the CPU.

The intermediate representation of the logic iterator may be compiled into a second portion of machine code and sequential executed on the particular CPU when the specifier of the particular target and execution policy (e.g.; std::par) indicates JIT compilation for sequential execution on the CPU. The intermediate representation of the logic iterator may also be compiled into machine code and parallel executed on the particular CPU when the specifier of the particular target and execution policy (e.g., std::par) indicates JIT compilation for parallel execution on the CPU. Furthermore, the intermediate representation of the logic iterator is dynamically compiled into a second portion of machine code and executed on the particular CPU when the specifier of the particular target and execution policy (e.g., std::env) indicates runtime selectable JIT compilation and execution on the CPU.

This Summary is provided to introduce a selection of concepts in a simplified form that are further described below in the Detailed Description, This Summary is not intended to identify key features or essential features of the claimed subject matter, nor is it intended to be used to limit the scope of the claimed, subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
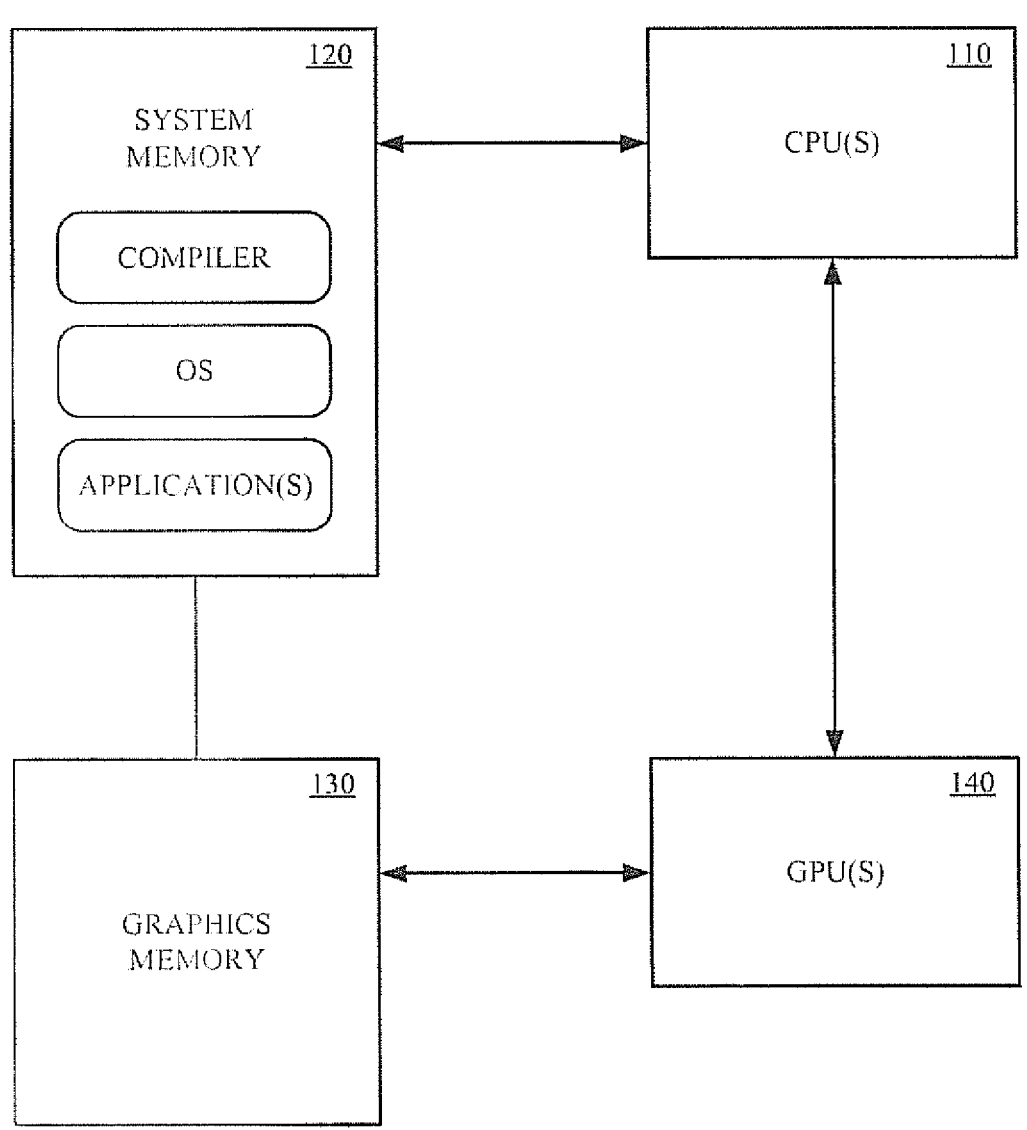
FIG. 1 shows a block diagram of an exemplary computing device for implementing embodiments of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices, The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being, stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated other vise as apparent from the following discussion, it is understood that through discussions oldie present technology, discussions utilizing the terms such as "receiving," "processing," "accessing," "executing." "rendering," "storing," "outputting" and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Embodiments of the present technology provide solutions for the increasing challenges inherent in compiling and running applications written in a standard language, such as C++, for a given target processing unit (e.g., CPU), such that they can be offloaded to another processing unit (e.g., GPU). As discussed in detail below, in one embodiment, an exemplary compiler and runtime environment are operable to execute an application on a native CPU entirely or can dynamically offload. and just-in-time (JIT) the parallel loop to the GPU or any similar processing unit. Exemplary embodiments will be operable to recompile and run standard CPU C++ applications in a GPU and increase the value of the GPUs.

In one exemplary embodiment of the present invention, a compiler and a runtime library achieve portability of standard source code, such as C++ code. The library provides a set of pre-defined algorithms which reflect some operators defined in the Standard Template Library (STIL). They take an extra parameter which gives the runtime a hint about the target and execution policy to be selected to run the algorithm.

Referring to FIG. 1, an exemplary computing device for implementing embodiments of the present technology is shown. The exemplary computing device 100 includes one or more CPUs 110, one or more memory units 120, 130 and one or more GPUs 140 communicatively coupled together. Typically the one or more CPUs 110 are communicative coupled to system memory 120 and the one or more GPUs 140 by one or more communication interfaces (e.g., communication buses, chip sets and the like). The one or more GPUs 140 May also be communicatively coupled to graphics memory 130 by one or more communication interfaces. The system memory 120 and graphics memory 130 may also be communicatively coupled together by one or more communication interfaces to provide for direct memory access (DMA) between the system memory 120 and graphics memory 130.

As used herein, a GPU 140 is a processing unit with a parallel throughput architecture that is characterized by executing a relatively larger number of concurrent threads relatively slowly. While a CPU 110, as used herein, is a processing unit with a multi core architecture that is characterized by executing a relatively smaller number of concurrent threads relatively faster. GPUs are more effective than CPUs for algorithms where processing of large blocks of data is done in parallel.

The memory, more generally referred to as computing device-readable media, provides for storage of computing device-executable instructions and data for use by the computing device. For instance, secondary memory such as a hard disk drive provides for non-volatile storage of the operating system(OS), applications (e.g., programs, drivers, routines utilities, and libraries), data and the compiler. The primary memory, such as system memory and/or graphics memory, provides for volatile storage of all or a portion of the operating system, all or a portion of the compiler, and all or a portion of one or more applications and associated data that are currently used by the CPU, GPI and the like.

As used herein a computing device executable algorithm is a set of unambiguous instructions for solving a problem in a finite amount of time using a finite amount of data. The operating system, applications, and compiler each include one or more computing device executable instructions that implement one or more computing device executable algorithms. The computing device executable algorithms advantageously implement repeatable solutions quickly and consistently for different situations and data.

The compiler is a computer program that transforms (e.g., translates) source code written in one or more given programming languages into object code for a given target computing device. The object code may be an intermediate programming language such as register transfer language (RTL), or machine code that is directly executable by a computing device. The compiler may operate in conjunction with one or more libraries, utilities, routines and the like.

Figure 2:
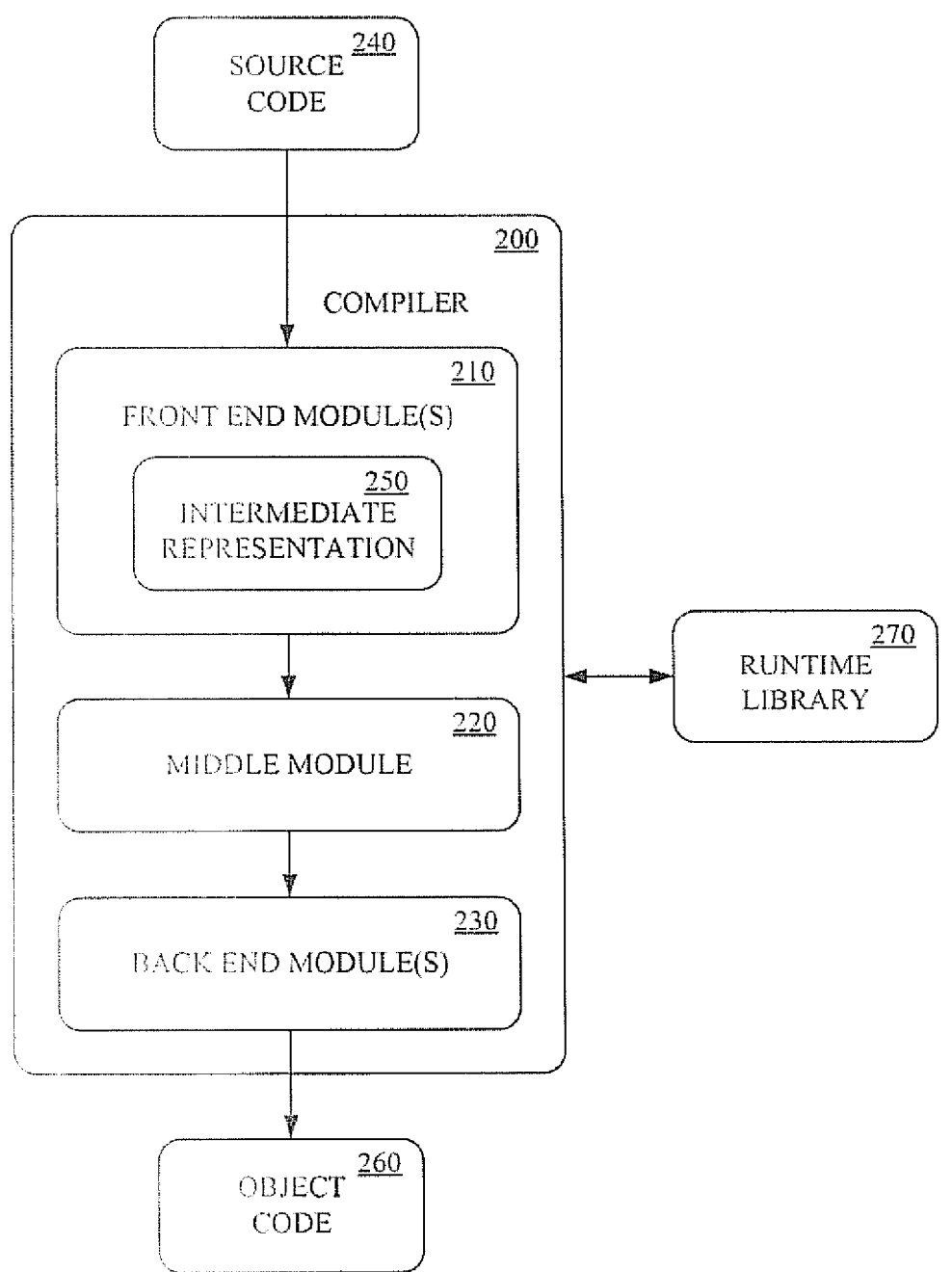
FIG. 2 shows a block diagram of an exemplary compiler, in accordance with embodiments of the present technology.

Referring now to FIG. 2 an exemplary compiler for implementing embodiments of the present technology is shown. The compiler 200 performs lexical analysis, preprocessing, parsing, semantic analysis (e.g., syntax-directed translation), code generation, and code optimization. The compiler 200 generally includes one or more front end modules 210, a middle module 220 and one or more back end modules 230. Typically each front end module 210 is operable for a particular source code 240, while each back end module 230 is operable for a particular target device (e.g., operating system and CPU).

The front end module 210 receives source code 230 written in a given programming language, verifies lexical, parses, and semantics analysis. Lexing and parsing includes the syntactic analysis wherein the source code is broken down into small pieces called tokens that are single atomic units of the source code language, Lexing includes scanning and evaluating the source code. Parsing includes building a concrete syntax tree (e.g., CST, parse tree) and then transforming it into an abstract syntax tree (e.g., AST, syntax tree). The semantic analysis adds semantic information to the parse tree and builds a symbol table, while performing type checking, object binding, definite assignment or the like. The front end module 210 generates an intermediate representation 250 of the source code for processing by the middle module 220.

The middle module 220 performs analysis and optimizations. The analysis functions gather program information front the intermediate representation, data-flow analysis is used to build use-define chains together with dependency analysis, alias analysis, pointer analysis, escape analysis and the like. Optimization transforms the first intermediate language representation into functionally equivalent but faster and/or smaller forms. Popular optimizations include inline expansion, dead code elimination, constant propagation, loop transformation, register allocation, automatic parallelization, and the like.

The back end module 230 generates the object code 260 for a target platform, performing register allocations in the process, and optimizes target code utilization of the hardware. The back end module 230 includes code generation functions for translating the intermediate representation 250 into the object code 260. The translation involves resource and storage decisions and the selection and scheduling of appropriate machine instructions along with their associated address modes.

Compilation may be performed prior to execution or may be done during execution of the program at runtime. Compilation performed prior to execution is referred to as static compilation or ahead of time (AOT) compilation. Compilation performed during runtime is referred to as just-in-time (JIT) compilation or dynamic translation. JIT compilation allows adaptive optimization such as dynamic recompilation.

The compiler 200 operates in conjunction with a runtime library 270. The runtime library 270 is a set of low-level routines used by a compiler to invoke some of the behaviors of a runtime environment, by inserting calls to the runtime library 270 into compiled executable object code 260.

Figure 3:
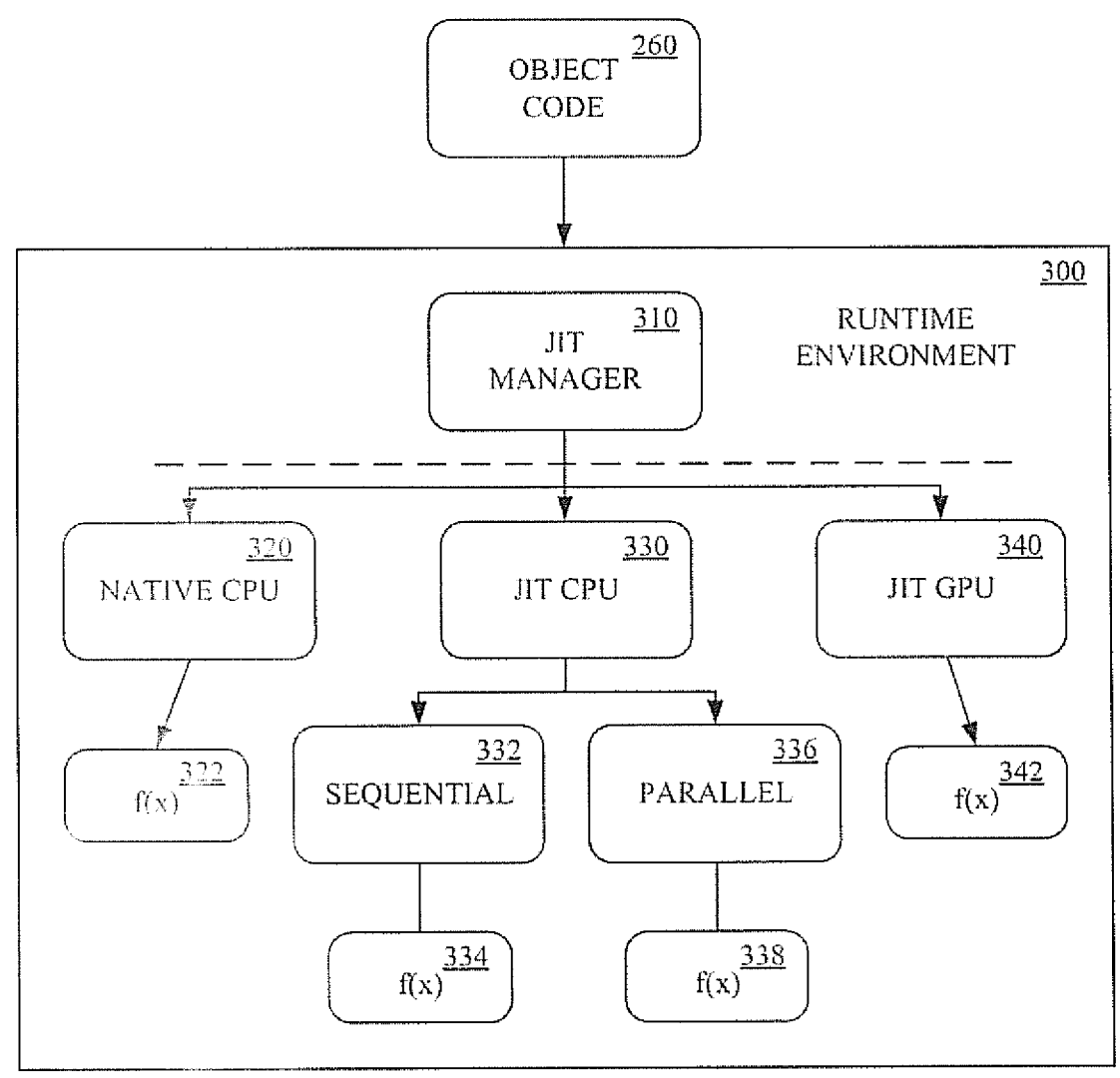
FIG. 3 shows a block diagram of an exemplary runtime environment, in accordance with embodiments of the present technology.

Referring now to FIG. 3, a runtime environment in accordance with embodiments of the present technology is shown. The runtime environment 300 includes a JIT manager 310 that receives object code 260. The JIT manager 310 selects one of a native execution 320 of a function, functor, function pointer, lambda or the like 3222 on the CPU, a JIT sequential execution 330, 332 of a function, functor, function pointer, lambda or the like 334 on the CPU, JIT parallel execution 336, 338 of a function, functor, function pointer, lambda or the like 338 on the CPU, or a JIT execution 340 of a function, functor, function pointer, lambda or the like 342 on the GPU based upon a specifier of a particular target and execution policy. The runtime environment 300 implements the execution model, built-in functions, and other fundamental behaviors of the programming language of the source code. During execution of a given computer program, execution of those calls to the runtime library 270 causes communication between the executable object code 260 and the runtime environment 300. A runtime library 270 often includes built-in functions for memory management, exception handing, and the like.

The compiler 200 receives source code 240 that includes a logic iterator, such as C++ parallel for each iterator. The compiler 200 coverts the source code 240 to a first portion of object code 260 for execution on the CPU 110 of the computing device 100. An intermediate representation 250 of the logic iterator is generated by the compiler 200 and includes a specifier of a particular target and execution policy. The runtime library 270 includes a plurality of environment algorithms including implementations of target and execution policies. The target and execution policies include ahead-of-time (AOT) compilation for execution on the CPU, just-in-time (JIT) compilation for sequential execution on the CPU, just-in-time (JIT) compilation for parallel execution on the CPU (e.g., std::par), JIT compilation for parallel execution on a GPU of the computing device (e.g., std::gpu), and runtime selectable compilation and execution (e.g., std::env).

The compiler 200 is configured to embed the intermediate representation of the logic iterator into the compiled first portion of machine code when the specifier of the particular target and execution policy indicates JIT compilation for sequential execution on the CPU, JIT compilation for parallel execution on the CPU, JIT compilation for execution on a GPU, or runtime selectable compilation and execution. When the specifier of the particular target and execution policy indicates JIT compilation for parallel execution on the GPU, the compiler 200 is configured to convert during runtime the intermediate representation of the logic iterator into a second portion of machine code for execution on the GPU. In one implementation the second portion of machine code is compiled for (CUDA) execution. The GPU is accessible through CUDA-accelerated libraries, compiler directives and extension to C++ 11 programming language. CUDA provides both a lower level application programming interfaces (API) and a higher level API. Thereafter the runtime environment 100 executed the second portion of the machine code on the GPU such that the logic iteration is parallel executed across a plurality of processing pipelines of the GPU.

The compiler 200 is also configured to convert during runtime the Intermediate representation of the logic iterator into a second portion of machine code for execution on the CPU when the specifier of the particular target and execution policy indicates JIT compilation for sequential execution on the CPU or JIT compilation for parallel execution on the CPU. Thereafter, the runtime environment sequentially executes the machine code on the CPU, when the specifier of the particular target and execution policy indicates JIT compilation for sequential execution on the CPU, Alternatively, the runtime environment parallel executes the machine code across a plurality of threads and/or cores on the CPU, when the specifier of the particular target and execution policy indicates JUT serial compilation for parallel execution on the CPU.

For example, consider the exemplary code listed below. This exemplary code implements the Black Scholes function using parallel for each and C++ lambdas. This example uses standard C++ 11 source to describe the Black-Scholes algorithm using a parallel for each iterator over a vector of stock data. The logic of the computation is described in a lambda expression.

```
struct Stock {
        double S, X, T, r, v;         // price, rates, ...
        double call, put;            // call and put options
};
...
std : : vector<Stock> input (size);
...
std : : for each(
        std : : par,
        std : : begin(input), std : : end(input),
        [ ] (Stock &i)
        {
            const double dl = (log((i . S / i . X))+(i . r + i . v * i . v / 2) * i . T)
                                          /(i . v * sqrtf(i . T));
                const double d2 = d1 – i . v * sqrt(i . T);
                i . call i . S * CND (d1) – i . X * exp(–i . r & i . T) * CND(d2);
                    i . put = i . X * exp(–i . r * i . T) * CND (–d2) – i .S * CND(–
                    d1);
        });
    ...
```

The first parameter (std::par) of the for each is a specifier of the particular target and execution policy that is used to control the execution at runtime. With the standard implementation of vectors and the for each iterator the code shown can be compiled and run as a sequential or a parallel loop on any CPU where a C++ compiler is available. In the above example, the first parameter set as std::par causes compilation for parallelized execution on the native target device.

In the following other exemplary code implementing the Black Scholes function, the specifier of the particular target and execution policy std::env causes execution at runtime to be determined based by an environment variable.

```
struck Stock {
        double S, X, T, r, v;         // price, rates, ...
        double call, put;.           // call and put options
};
...
std : : vector<Stock> input (size);
...
    std : : for each(
        std : : env,
        std : : begin(input), std : : end(input),
        [ ] (Stock &i)
        {
            const double dl = (log((i . S / i . X))+(i . r + i . v * i . v / 2) * i . T)
                                          /(i . v * sqrtf(i . T));
                const double d2 = d1 – i . v * sqrt(i . T);
                i . call i . S * CND (d1) – i . X * exp(–i . r & i . T) * CND(d2);
                i . put = i . X * exp(–i . r * i . T) * CND (–d2) – i .S * CND(–d1);
        });
    ...
```

Accordingly, the environment variable enables dynamic selection during object execution.

In exemplary embodiments of the present invention, the lambda code can be compiled to a CPU target, and during execution of the native CPU program the logic iterator (e.g. for each) portion can be executed in parallel either on the CPU or a GPU using runtime compilation of the lambda function and all its dependencies, using an exemplary runtime and compiler that can embed the intermediate representation (IR) for the lambda into the compiled CPU program.

As discussed herein, an exemplary runtime may be provided for four different targets:

Native: an AOT compiled for serialized execution on the native target device.

Native JIT: the code will be JIT optimized and compiled for serialized execution on the native target device.

Native JIT Parallel: the code will be JIT optimized and compiled for parallelized execution on the native target device.

GPU: the code will be JIT transformed and compiled for parallelized execution on re-targeted device.

The targets can be selected from the source code or dynamically during the program execution. The runtime uses a fallback system to re-target the code automatically from a target to another in case of failure. Accordingly, a special runtime implementation of the logic iterator may be used that can offload the vector to a GPU or leave it on the native CPU, and then dynamically generate the code for the GPU or CPU, from the embedded IR for the lambda expression and launch the execution to the GPU or CPU as appropriate and then transfer the data block as appropriate.

Embodiments of the present technology advantageously transform runtime environments to execute parallel logic iterators natively on a particular CPU or retargeted to execute on a. particular GPU. The compiling of source code to object code is transformed by embedding intermediate representations of logic iterators in the object code for selective execution on a particular CPU or GPU based upon a specifier of a particular target and execution policy. The techniques advantageously enable execution of parallel logic, iterators on the GPU and not the CPU, thereby increasing utilization of the GPU and increasing processing performance of the computing device. Furthermore, the increased GPU utilization and increased processing performance of the computing device realized by embodiments of the present technology increases the value of GPUs and computing devices that include GPUs.

The foregoing descriptions of specific embodiments of the present technology have been presented for purposes of illustration and description, They are not intended to be exhaustive or to limit the invention to the precise forms disclosed, and obviously many modifications and variations are possible in light of the above teaching. The embodiments were chosen and described in order to best explain the principles of the present technology and is practical application, to thereby enable others skilled in the art to best utilize the present technology and various embodiments with various modifications as are suited to the particular use contemplated. It is intended, that the scope of the invention be defined by the claims appended hereto and their equivalents.

What is claimed is:

1. A processor, comprising:
one or more circuits to perform a compiler to compile code, during execution of machine code based, at least in part, on an execution policy embedded in the machine code indicating one or more first portions of the code to be compiled to be performed by a central processing unit (CPU) and one or more second portions of the code to be compiled to be performed by a graphics processing unit (GPU).

2. The processor of claim 1, wherein the execution policy embedded in the machine code is at least one intermediate representation of a specifier of the execution policy.

3. The processor of claim 1, further comprising a runtime library defining a plurality of execution policies including:
just-in-time (JIT) parallel code implementations to be performed by the GPU; and
runtime selectable compilation on the GPU.

4. The processor of claim 3, wherein a compiler module is further configured to generate, during runtime, using at least the runtime library, object code to be performed by the GPU.

5. The processor of claim 4, wherein the compiler module is further configured to use the runtime library to generate the object code by selecting at least one execution policy of the plurality of execution policies.

6. The processor of claim 4, wherein the object code is compiled for compute unified device architecture (CUDA).

7. The processor of claim 1, wherein the execution policy specifies at least one of a sequential execution policy and a parallel execution policy.

8. A method, comprising:
compiling code, during execution of machine code based, at least in part, on a an execution policy in the machine code indicating:
one or more first portions of the code to be compiled to be performed by a central processing unit (CPU); and
one or more second portions of the code to be compiled to be performed by a graphics processing unit (GPU).

9. The method of claim 8, wherein the execution policy in the machine code is at least one intermediate representation of a specifier of the execution policy.

10. The method of claim 8, further comprising:
providing a runtime library defining a plurality of execution policies including:
just-in-time (JIT) parallel code implementations to be performed by the GPU; and
runtime selectable compilation on the GPU.

11. The method of claim 10, further comprising: generating, during runtime, using at least the runtime library, object code to be performed by the GPU.

12. The method of claim 11, further comprising:
using the runtime library to generate the object code by selecting at least one execution policy of the plurality of execution policies.

13. The method of claim 11, wherein the object code is compiled for compute unified device architecture (CUDA).

14. The method of claim 8, wherein the execution policy specifies at least one of a sequential execution policy and a parallel execution policy.

15. A system, comprising:
a central processing unit (CPU);
a graphics processing unit (GPU); and
a non-transitory computer-readable medium storing instructions executable by at least one of the CPU or the GPU to:
compile code, during runtime of machine code based, at least in part, on an execution policy in the machine code indicating one or more first portions of the code to be compiled to be performed by the CPU and one or more second portions of the code to be compiled to be performed by the GPU.

16. The system of claim 15, wherein the execution policy is at least one intermediate representation of a specifier of the execution policy.

17. The system of claim 15, wherein the instructions executable by the at least one of the CPU or the GPU are further configured to provide a runtime library defining a plurality of execution policies including:

just-in-time (JIT) parallel code implementations to be performed by the GPU; and runtime selectable compilation on the GPU.

18. The system of claim 17, wherein the instructions executable by the at least one of the CPU or the GPU are further configured to generate, during runtime, using at least the runtime library, object code to be performed by the GPU.

19. The system of claim 18, wherein the instructions executable by the at least one of the CPU or the GPU are further configured to use the runtime library to generate the object code by selecting at least one execution policy of the plurality of execution policies.

20. The system of claim 15, wherein the execution policy is based on an execution policy that specifies at least one of a sequential execution policy and a parallel execution policy.

\* \* \* \* \*